(12) United States Patent
Watanabe et al.

(10) Patent No.: US 6,795,094 B1
(45) Date of Patent: Sep. 21, 2004

(54) METHOD AND APPARATUS FOR PROCESSING AN IMAGE, AND STORAGE

(75) Inventors: Kazuhiro Watanabe, Tokyo (JP); Yasushi Shiotani, Hayama-machi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/062,015

(22) Filed: Apr. 17, 1998

(30) Foreign Application Priority Data

Apr. 22, 1997 (JP) .............................................. 9-104387

(51) Int. Cl.[7] .............................................. G06F 15/00
(52) U.S. Cl. ..................................... 345/762; 345/765
(58) Field of Search ................................ 345/723, 762, 345/765, 764, 840, 841, 853

(56) References Cited

U.S. PATENT DOCUMENTS

| | | | | |
|---|---|---|---|---|
| 5,579,471 A | * | 11/1996 | Barber et al. ................ | 345/700 |
| 5,625,810 A | * | 4/1997 | Kurosu et al. ............... | 345/825 |
| 5,640,522 A | * | 6/1997 | Warrin ........................ | 345/797 |
| 6,028,603 A | * | 2/2000 | Wang et al. ................. | 345/776 |
| 6,040,825 A | * | 3/2000 | Yamamoto et al. .......... | 345/173 |
| 6,121,969 A | * | 9/2000 | Jain et al. .................... | 345/848 |

* cited by examiner

*Primary Examiner*—Cao (Kevin) Nguyen
(74) *Attorney, Agent, or Firm*—Fitzpatrick, Cella, Harper & Scinto (57) ABSTRACT

An image processor in which images are displayed on the screen of a display device in such a manner that visually recognizable labels corresponding to keywords assigned to respective images are displayed near the corresponding images thereby making it easy for a user to see which keywords are assigned to the respective images.

45 Claims, 9 Drawing Sheets

METHOD AND APPARATUS FOR PROCESSING AN IMAGE, AND STORAGE

BACKGROUND OF THE INVENTION

1. Field of the Invention

The present invention relates to an image processing apparatus having the capability of retrieving and sorting images input from an input device, such as a digital camera, according to a condition such as a keyword, and also to a method thereof.

2. Description of the Related Art

In conventional image processing apparatus, a keyword used in retrieving or sorting of images is provided by a user for direct entry through a keyboard or the like.

To provide a user with information about which keywords are assigned to respective images, a keyword is generally displayed together with a corresponding image one by one.

When keywords are assigned to a plurality of images in accordance with the places and situations in which the respective images were taken, it is required that the user observe the images one by one.

However, when a significant number of images are dealt with as in the case where images are taken by a modern sophisticated digital camera system, the entering of keywords through a keyboard from one image to another becomes difficult.

Furthermore, when a plurality of images are displayed in the form of a list of thumbnail images, it is difficult to display keywords associated with the respective images in a limited display area and thus the user cannot know which keywords are assigned to the respective images.

SUMMARY OF THE INVENTION

To solve the above problems, the invention provides an image processing apparatus including storage means for storing a plurality of image data, and control means for controlling the process of displaying a plurality of image data stored in the storage means in the form of a list of thumbnail images so that labels corresponding to the keywords of the image data are displayed near the respective image data.

DESCRIPTION OF THE PREFERRED EMBODIMENT

The present invention is described in further detail below with reference to a preferred embodiment.

Figure 7:
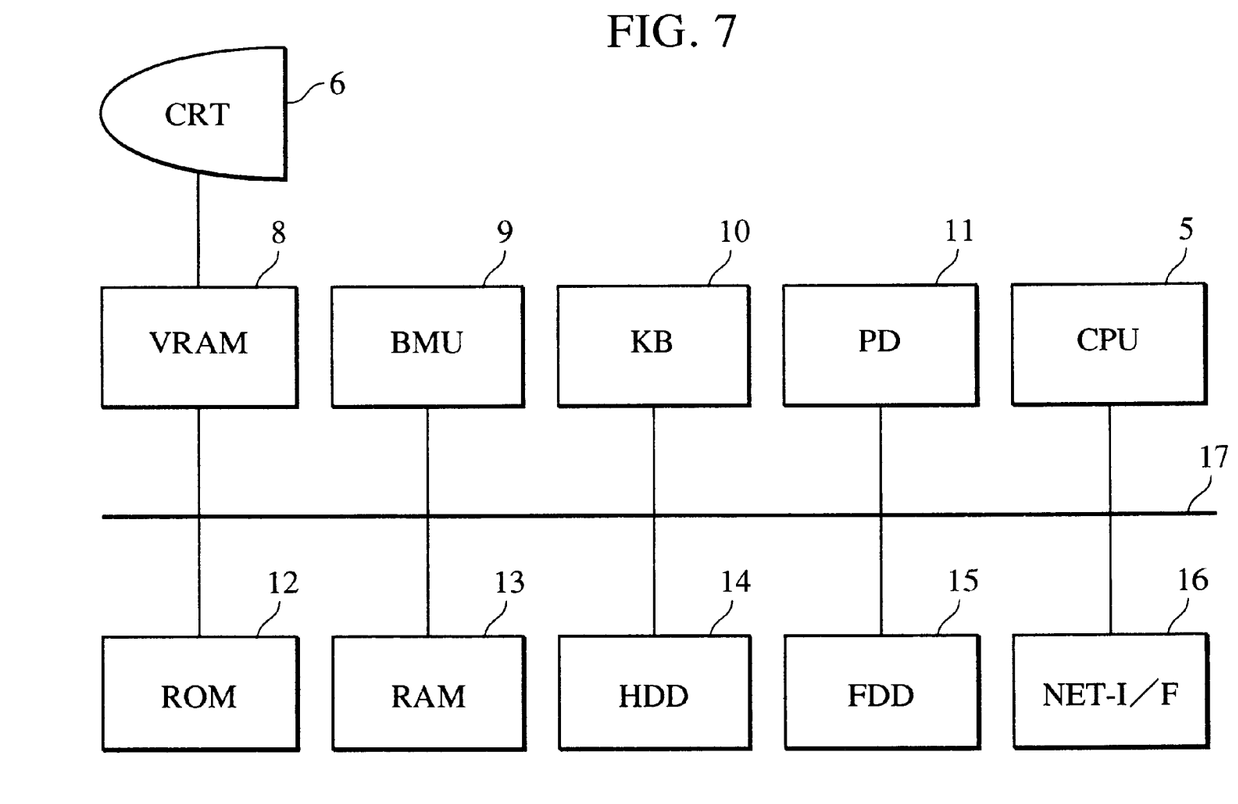
FIG. 7 is a block diagram illustrating the image processing apparatus according to an embodiment of the invention.

FIG. 7 illustrates the construction of an image processing apparatus according to the present invention.

Figure 1:
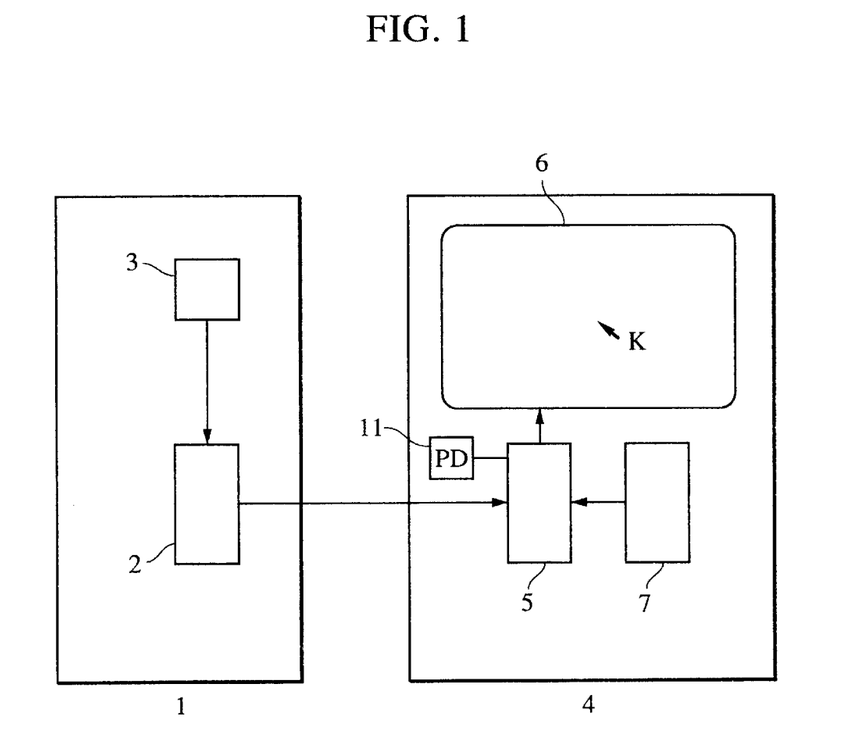
FIG. 1 is a block diagram illustrating an embodiment of an image processing apparatus according to the present invention and also illustrating a system including the image processing apparatus.

The image processing apparatus shown in FIG. 7 corresponds to that denoted by reference numeral 4 in FIG. 1.

In FIG. 7, similar elements to those in FIG. 1 are denoted by similar reference numerals.

In the image processing apparatus shown in FIG. 7, a CRT display device 6 displays image data taken by a digital camera or the like and also various kinds of information such as message menus. The CRT display device 6 may be replaced with a liquid crystal display device. A video RAM (VRAM) 8 is used to store character and image data to be displayed on the screen of the CRT display device 6.

A bit move unit (BMU) 9 controls data transfer among memories or between memories and various devices. A keyboard 10 including various keys is used to enter information required for editing images or for other operations. A pointing device (PD) 11 is used to point to image data or an icon on the screen of the display device 6. A CPU 5 controls various parts of the image processing apparatus in accordance with a control program stored in a ROM 12 (which includes a program for editing images and other programs for performing various processes according to the invention).

The image processing apparatus also includes: a RAM 13 used by the CPU 5 as a working area during the operation of performing various programs and also used to temporarily store data when an error occurs; a hard disk drive (HDD) 14; and a floppy disk drive (FDD) 15. The hard disk drive 14 and the floppy disk drive 15 are used to store programs, data and libraries which will be described later.

Furthermore, there is provided a network interface (NET-I/F) 16 for controlling and diagnosing data in the operation of transferring and receiving data to and from another image processing apparatus via a network. The units described above are connected to each other through an I/O bus (including an address bus, a data bus, and a control bus) 17.

In this embodiment, the program stored in the ROM 12 may also be stored on another storage medium such as a hard disk (HD) or a floppy disk (FD) directly connected to the image processing apparatus or may be stored on another apparatus connected through a network to the image processing apparatus.

Referring to FIG. 1, an image processing means for processing image data taken via an image pickup apparatus such as a digital camera is described below. The related system construction and operation are also described.

Image data taken by an image pickup apparatus 1 shown in FIG. 1 is stored in a memory 2 provided therein. Date/time when the image is taken is measured by an internal clock 3 and the resultant date/time information is also stored as associated data in the memory 2. Furthermore, a reduced-size image (thumbnail image) corresponding to each image data is generated and stored in connection with the corresponding image data. The generation of reduced-size images may be accomplished using a known technique, and thus it is not described in further detail herein.

Although in this specific embodiment, it is assumed that the associated data is date/time information, the associated data may also be other types of information such as the identification code of the image pickup apparatus and information about operating conditions such as a shutter speed, a zooming ratio, and an f-stop number under which the image is taken by the image pickup apparatus. In the case where operating conditions are stored as the associated data, it is possible to retrieve image data using any operating condition as a keyword. However, the present embodiment is described only for the case where the associated data includes only date/time information associated with the respective images, and the operation of retrieving image data in terms of image taking conditions is not described.

The image data stored in the memory 2 is transferred to the image processing apparatus 4 via a removable external memory or via a cable, and the image data is displayed on the display device 6 of the image processing apparatus 4.

In the image processing apparatus 4, a microprocessor 5 generates images to be displayed on the screen of the display device 6 in accordance with the image data and associated data thereof stored in the memory 2 using the application program and associated data thereof stored in a memory 7 provided in the image processing apparatus 4. The resultant images are displayed on the display device 6.

A cursor pointer K is also displayed on the display device 6. When images are displayed in the form of a list of thumbnail images, keywords are assigned to images, or retrieval or sorting is performed, the position of the cursor pointer K is controlled via the pointing device 11 so as to achieve the purpose.

The present embodiment of the invention has the feature that when a plurality of reduced-size images corresponding to image data are displayed in the form of a list of thumbnail images, it is possible to easily see which keywords are assigned to the respective image data. This feature is described in further detail below.

Figure 2:
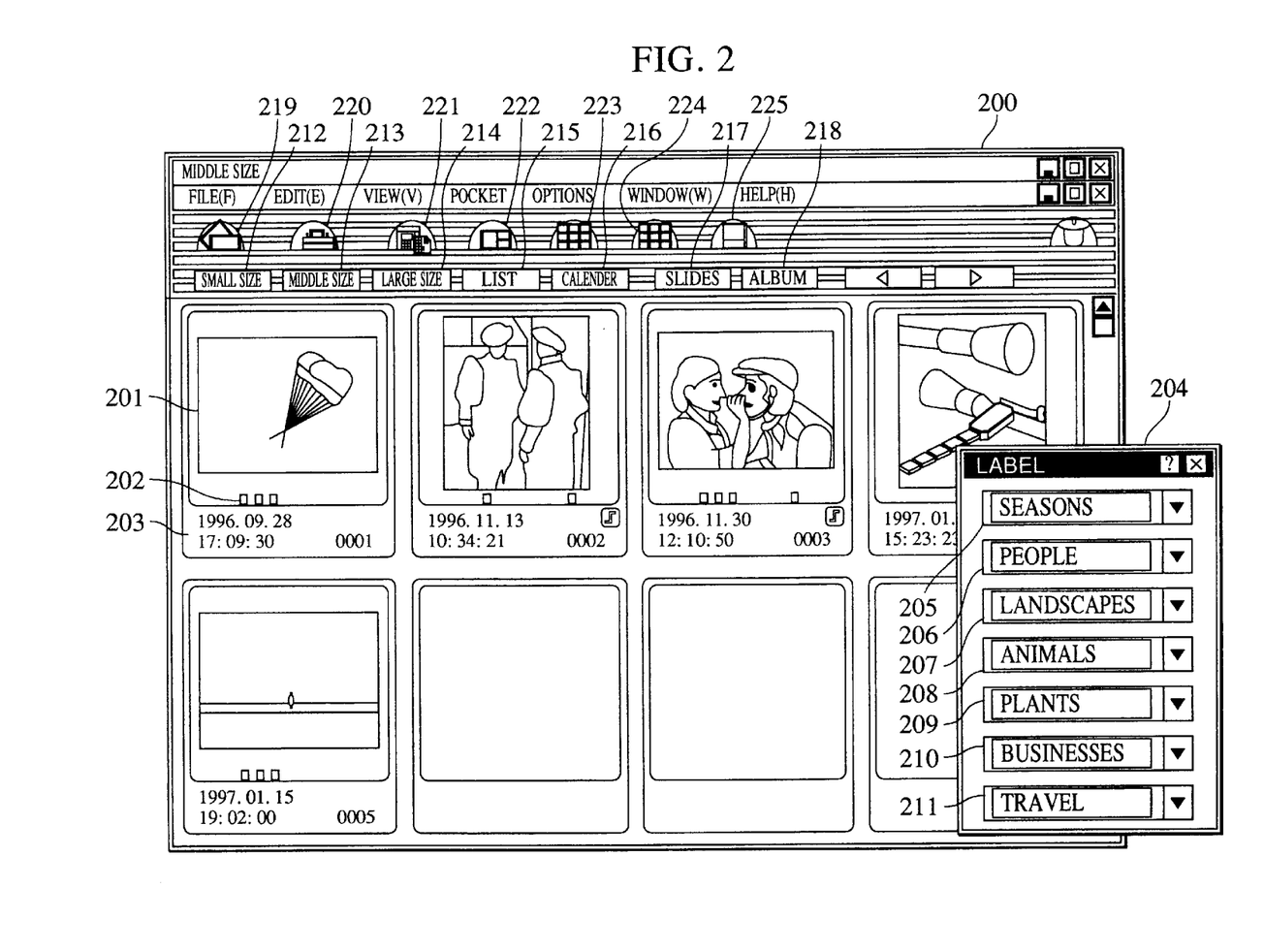
FIG. 2 is an illustration of images displayed on a screen according to the present invention.

FIG. 2 illustrates a screen on which images and associated data are displayed in a special manner characterizing the present invention.

When the application program according to the present embodiment is started, a sheet window is displayed so that it has a size within the screen of the display device 6 and so that the sheet size is equal to the final sheet size at the end of the previous operation. A desired sheet size can be selected by clicking a proper one of buttons "SMALL SIZE" (212), "MIDDLE SIZE" (213) or "LARGE SIZE" (214) shown in FIG. 2. In the example shown in FIG. 2, the sheet is displayed in the middle size. This occurs when the final size at the end of the previous operation was middle or when the middle size (button 213) is selected by a user after starting the application program.

After the sheet appears on the screen, if an icon 219 located on the upper side of the screen is clicked, image data stored in the memory of the image pickup apparatus is transferred to the image processing apparatus and reduced-size images 201 are displayed in the form of a list of thumbnail images together with date/time information 203, as shown in FIG. 2. At this stage, labels 202 corresponding to keywords are not assigned.

A particular label 202 can be given to a desired reduced-size image by dragging a label from a label window 204 and dropping it onto the reduced-size image. FIG. 2 illustrates a state in which the respective reduced-size images have their own labels 202 assigned in the above-described manner.

Each label has a particular color. For example, a label "seasons" 205 is colored with orange, "people" 206 with yellow, "landscapes" 207 with green, "animals" 208 with yellow green, "plants" 209 with blue, "businesses" 210 with purple, "travel" 211 with pink, and so on. Colored labels are placed near images having keywords corresponding to the labels so that the user can see, from the color of the labels, which keywords are assigned to the respective images.

That is, when a plurality of images are displayed in the form of a list of thumbnail images, the user can visually recognize the keywords assigned to the respective images.

For example, in FIG. 2, the image on the upper and left side of the screen has orange, yellow and green labels which indicate that keywords "seasons", "people", and "landscapes" have been assigned to this image. This makes it possible for the user to easily know at a glance which keywords are given to the respective images displayed in the form of a list of thumbnail images.

If keywords have been once defined for the respective labels in the label window 204, then any desired keyword can be assigned to a particular image simply by dragging a label and dropping it onto the reduced-size image as shown in FIG. 2. Thus, the invention provides a very easy way of assigning a keyword to image data.

Figure 3:
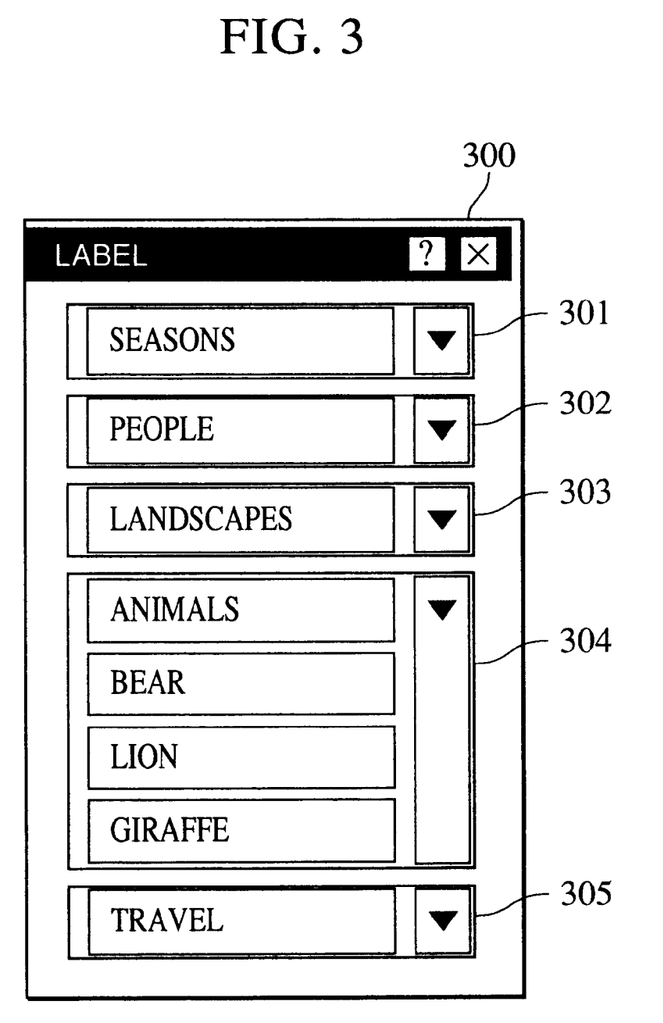
FIG. 3 is an illustration of a label window according to the present invention.

Referring now to FIG. 3, the label window is briefly described.

It is possible to set the display condition via the window menu shown in FIG. 2 so that the label window 300 is either displayed or not displayed on the screen.

Using the label window 300, a particular color can be assigned to each keyword. If a button at the right side of each label is clicked via the pointing device, sublabels appear in a drop-down window. The user can define arbitrary keywords for sublabels. The keywords defined for the respective sublabels are displayed in relation to the corresponding sublabels in the drop-down window. For example, when a keyword "animals" is defined for a certain label, further detailed keywords may be defined such as "bear", "lion", "giraffe", and so on for its sublabels. The user can assign a desired keyword to a particular image simply by dragging a sublabel and dropping it onto the reduced-size image.

Although in the specific example described above, color information is used to identify the respective labels, the labels may also be identified by symbols such as a triangle (Δ), a rectangle ([□]), a circle (○), etc. If desired, both colors and symbols may be employed to identify the labels.

Figure 8:
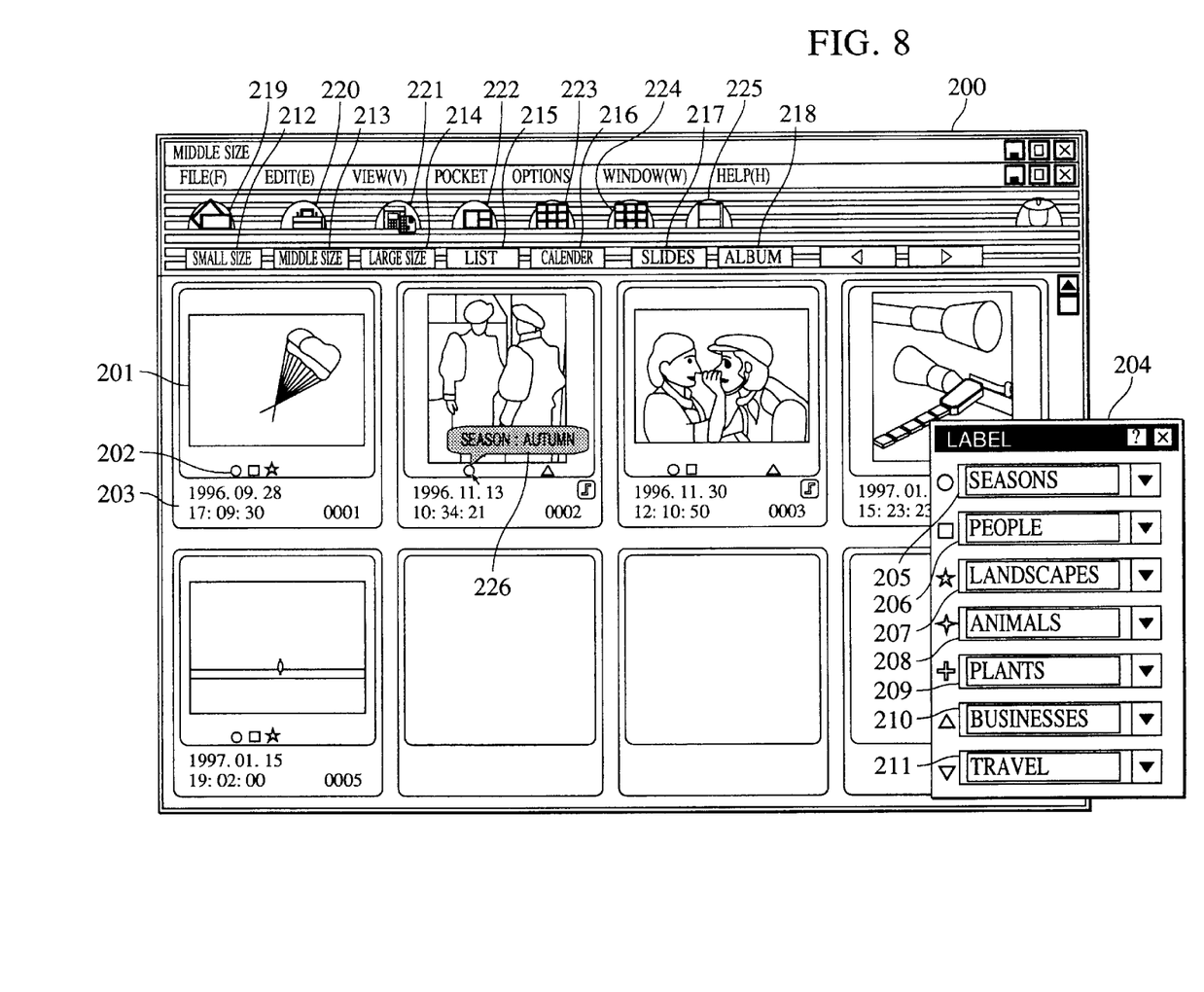
FIG. 8 is an illustration of images displayed on the screen according to an embodiment of the invention.
Figure 9:
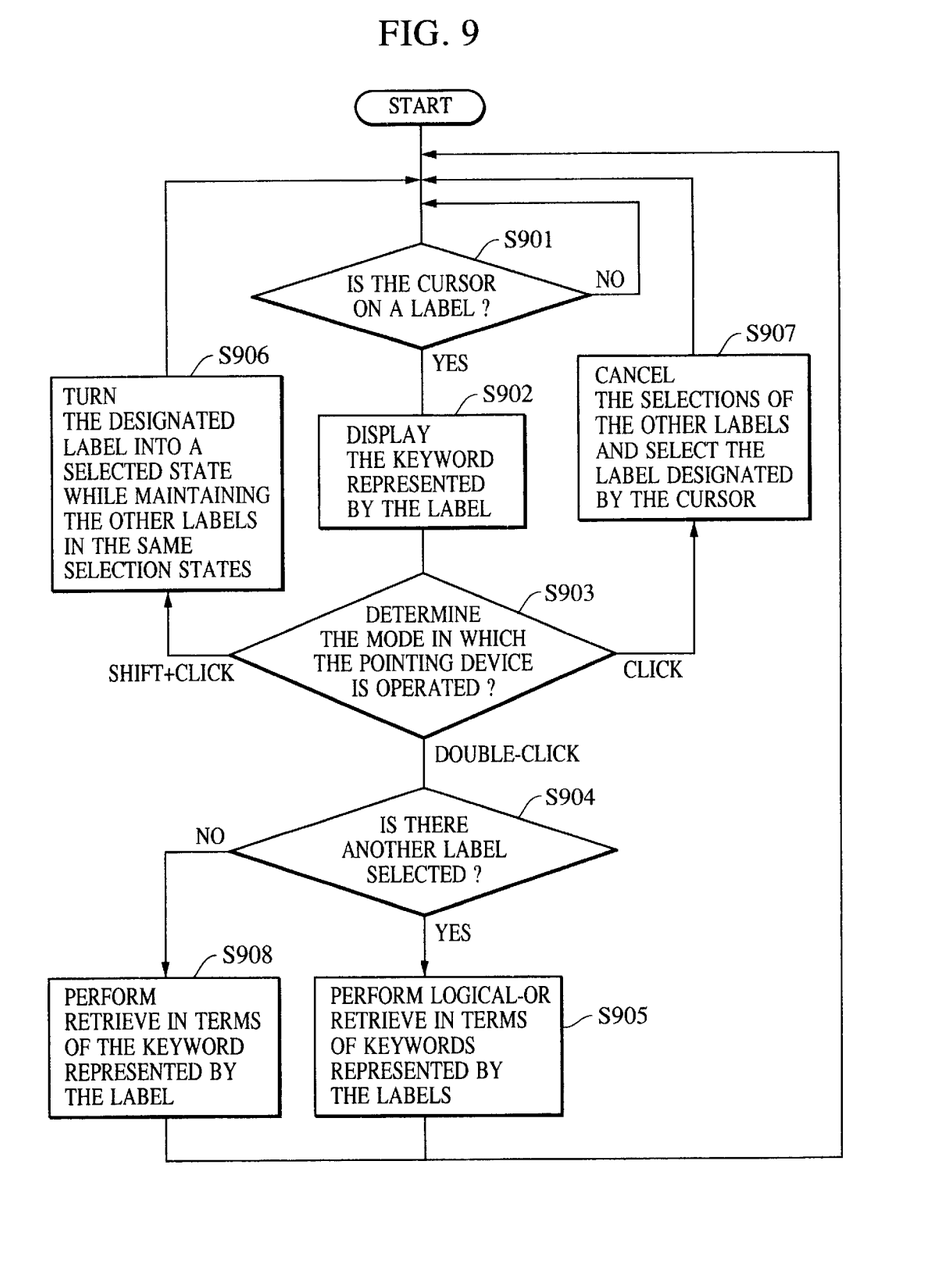
FIG. 9 is a flow chart illustrating a process of performing retrieval using labels.

Referring to FIGS. 8 and 9, the retrieving process using a label is described below.

FIG. 8 illustrates an example of an image screen according to the invention.

FIG. 9 is a flow chart associated with the retrieving process using labels.

In step S901 in FIG. 9, it is determined whether the cursor is on a label such as label 202 shown in FIG. 8. If it is concluded in step S901 that the cursor is on a label, then the process goes to step S902 in which the keyword represented by that label is displayed. For example, a message "Season: Autumn" is displayed in a message box 226 on the screen as shown in FIG. 8.

In step S903, it is determined whether the user has performed an operation via the pointing device on the message box in which the keyword ("Season: Autumn") is displayed.

If a double-click is detected in step S903, then it is further determined in step S904 whether there is another label selected. If another label is not selected, then the process goes to step S908, and retrieval is performed using the keyword represented by the label. The retrieval result is displayed in the form of a list of thumbnail images as shown in FIG. 8.

In the case where it is concluded in step S904 that another label is selected, then the process goes to step S905 and retrieval is performed in terms of a logical OR of keywords represented by the selected labels. The retrieval result is displayed in the form of a list of thumbnail images as shown in FIG. 8.

In the case where a click is detected in step S903, the process goes to step S907 in which the selection of labels other than the label currently pointed to by the cursor is canceled, and the label currently pointed to by the cursor is selected. If "SHIFT KEY+click" is detected in step S903, the label currently pointed to by the cursor is selected while maintaining the existing selected labels in the selected state.

As described above, if the cursor is placed on a label in the vicinity of a reduced-size image, the keyword represented by the label is displayed on the screen. Therefore, the user can easily see which keyword is assigned to the image.

If a label is double-clicked, reduced-size images having the keyword represented by that label are retrieved. If the above process is repeated, it is possible to easily perform retrieval in terms of a logical AND of a plurality of keywords. If retrieval is executed after selecting a plurality of labels using a "SHIFT KEY+click" command, then retrieval is performed in terms of a logical OR of a plurality of keywords.

In the process described above, the mode of operation of the pointing device is checked in step S903. Alternatively, the operation of the keyboard may be checked in step S903. Furthermore, detection by the pointing device may be performed for various combinations of double-click, click, and SHIFT+click.

The switching of the display mode is described below.

The sheet may be displayed in various sizes. If one of buttons "SMALL SIZE" 212, "MIDDLE SIZE" 213, and "LARGE SIZE" 214 is clicked, then the corresponding size is selected and the sheet is displayed in the selected size.

If the display mode is switched to a calender mode (by clicking the calender button 216), the reduced-size images corresponding to the respective images are sorted in terms of time on the basis of date/time information representing when the images were taken, and the resultant images are displayed along a time axis for a particular period of time such as a week, month or year (that is, in units of weeks, months or years).

Figure 4:
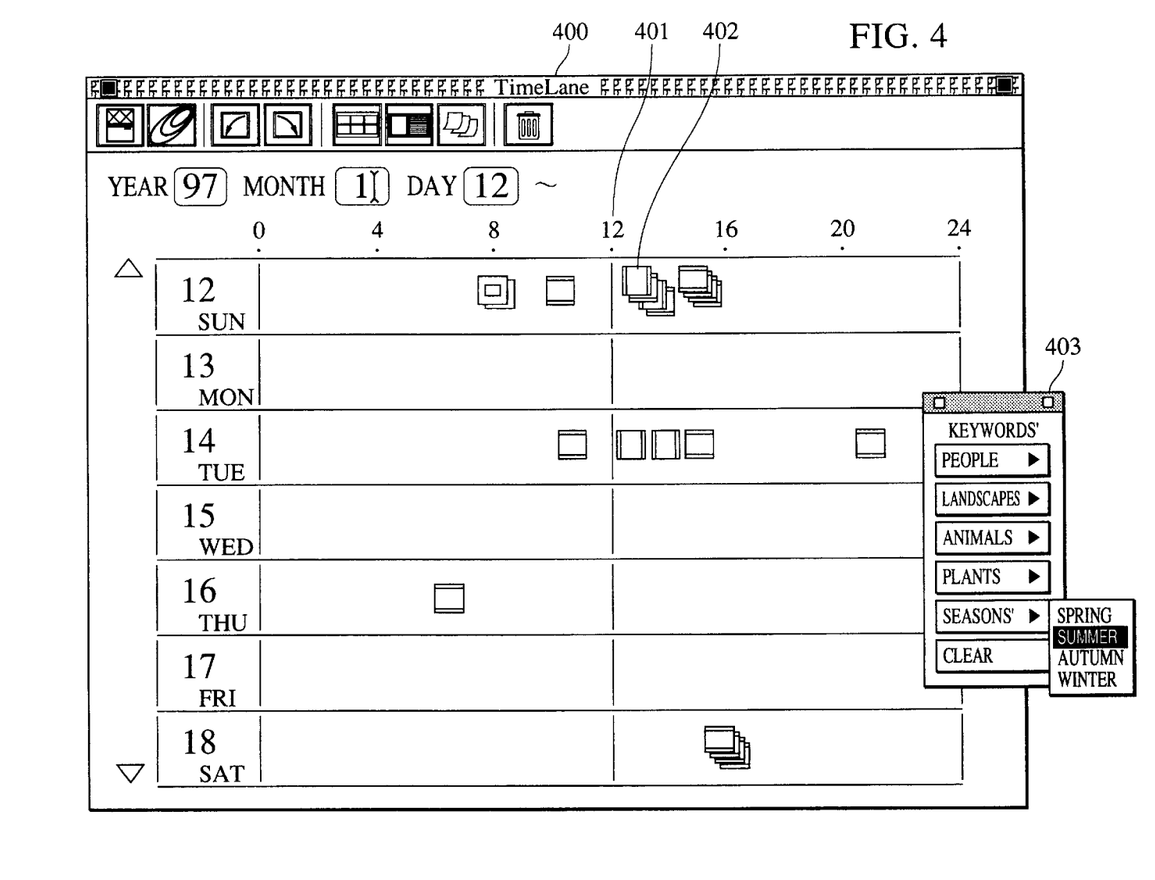
FIG. 4 is an illustration of an image displayed on the screen in another mode according to the present invention.

FIG. 4 illustrates an example in which images are displayed along the time axis for a particular week selected (in units of weeks).

Figure 5:
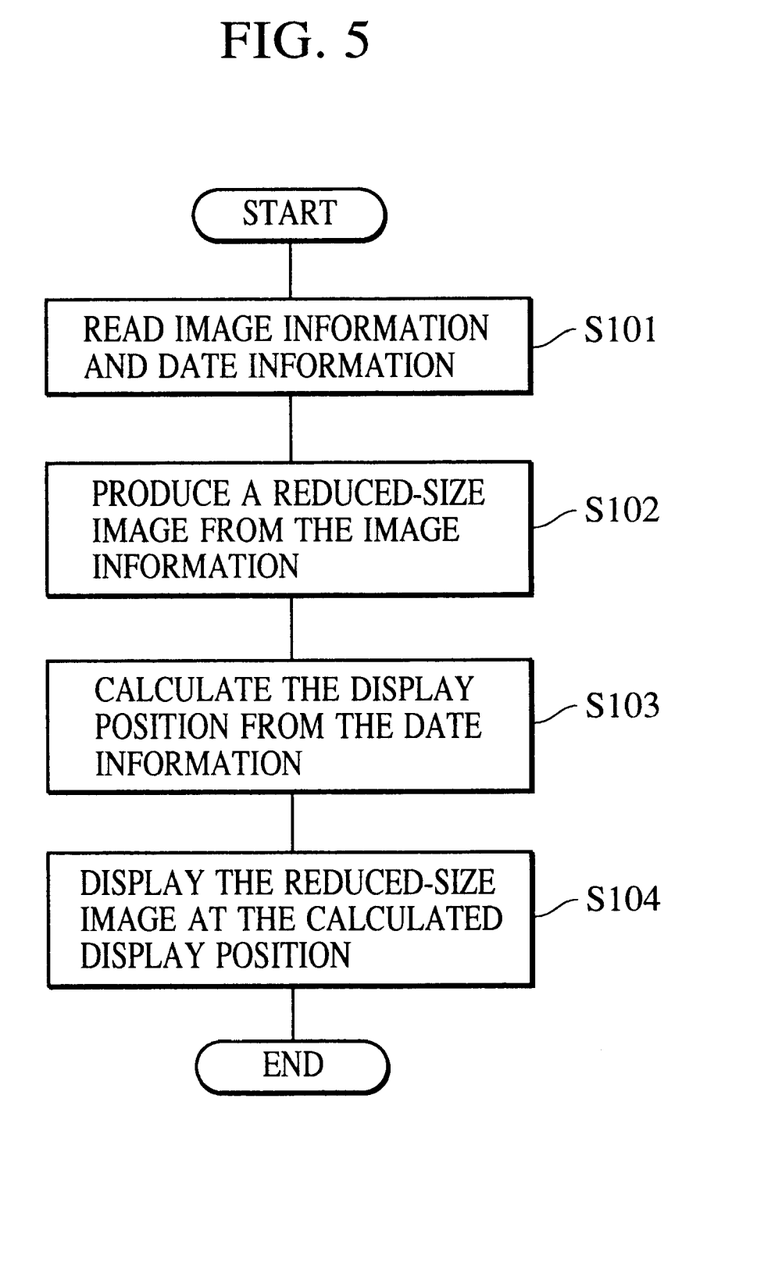
FIG. 5 is a flow chart illustrating a process of displaying an image in a calender mode.

The process of displaying images in the calender mode as shown in FIG. 4 is described below referring to the flow chart shown in FIG. 5.

In step S101, the microprocessor 5 reads image data and date/time information from the memory 2. Then in step S102, reduced-size images are produced from the image data read from the memory. In the case where reduced-size images have already been produced in the image pickup apparatus 1 in the manner described above, those reduced-size images may be directly displayed. In step S103, the display positions on the screen of the display device 6 are calculated from the date/time information. Then in step S104, the reduced-size images are displayed at the calculated display positions.

By performing the above process, the images are displayed on the screen as shown in FIG. 4.

In FIG. 4, reference numeral 400 denotes a window having a form in which images are displayed in units of weeks, and 401 denotes a time axis. When images are displayed in unit of weeks, the time axis is displayed in the full scale of 24 hours. On the other hand, when images are displayed in units of months, a calender of a month is displayed. If images are displayed in units of years, a calender of a year is displayed.

When a plurality of reduced-size images are displayed in the form of a stack as denoted by reference numeral 402, it is possible to assign a keyword to all of these images at one time. When a plurality of reduced-size images are displayed in the form of a stack, they were most likely taken at the same event such as at an exhibition or during travel. Therefore, the capability of assigning a keyword to all images at one time is very useful.

More specifically, a stack of images as that denoted by 402 may be selected via the cursor pointer or the like, and a keyword such as "travel to . . ." or "exhibition of . . ." may be assigned to the stack of images. In this case, the operation is similar to that of assigning a keyword to a single image described above, and thus the operation is not described in further detail herein. It is also possible to assign particular keywords such as "ipeople" or "season" individually to the respective images in the stack.

Figure 6:
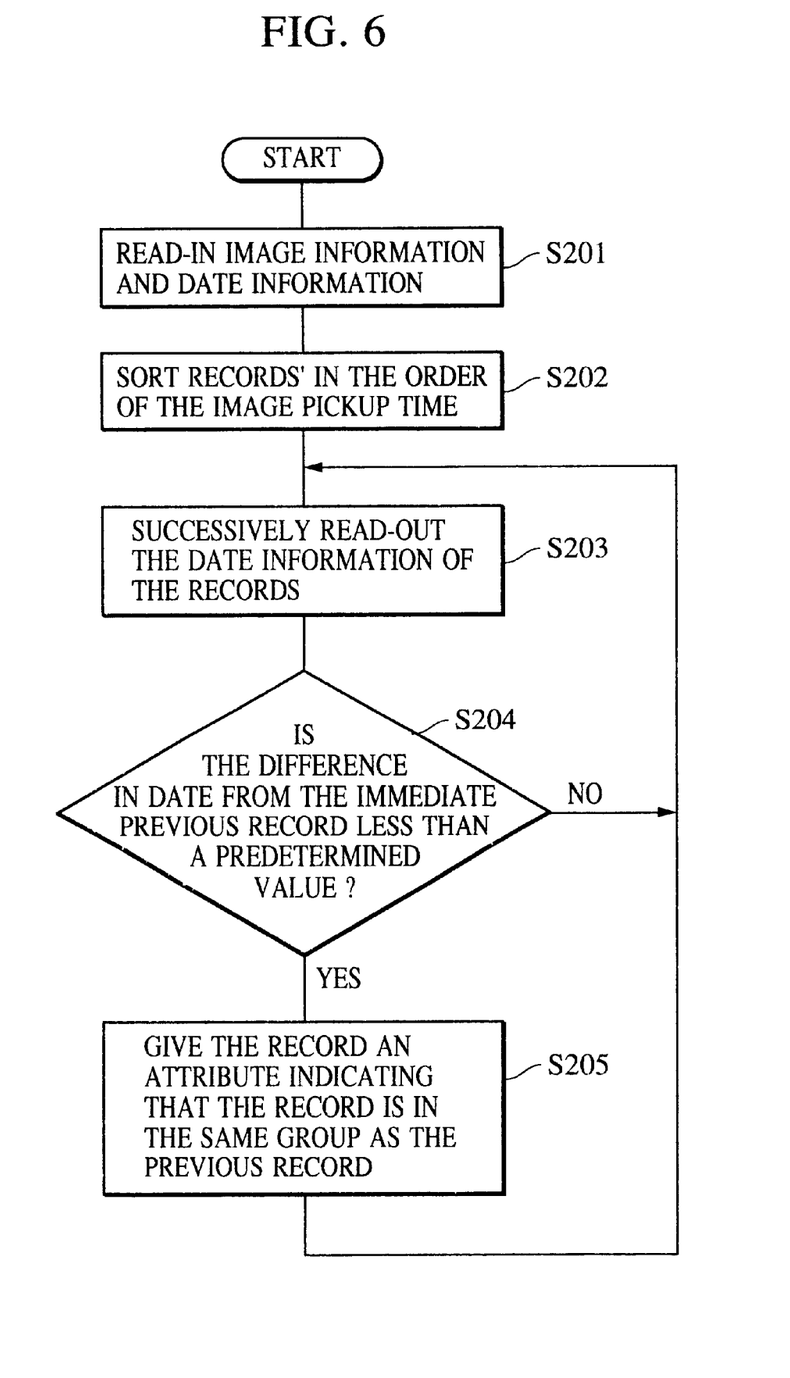
FIG. 6 is a flow chart illustrating a process of grouping a plurality of reduced-size images.

FIG. 6 is a flow chart illustrating the process of grouping a plurality of reduced-size images.

In step S201, the microprocessor 5 reads a set of image data and associated date/time information from the memory 2. In step S202, reduced-size images are sorted in the order of image taking date/time on the basis of the date/time information read from the memory. Then in step S203, the date/time information is read record by record in the sorted order. In step S204, the date/time information of the current image data is compared with that of the immediately previous image date, and it is determined whether the difference in time is less than a predetermined value. If it is concluded in step S204 that the difference is less than the predetermined value, then the process goes to step S205 in which the same attribute as that of the immediately previous image data is assigned to the current image data. On the other hand, if it is concluded in step S204 that the difference is greater than the predetermined value, then the process returns to step S203 and the date/time information of the next image data is read.

In the process described above, if the date/time information of the current image data has a small difference within the predetermined range relative to that of the immediately previous image data, the current image data is incorporated into the same group as that of the previous image data. In this way, a plurality of image data are grouped. Furthermore, a particular keyword may be assigned to a particular group.

The predetermined value used as the reference in the above process to determine the difference in date/time is set to a particular default value. If desired, the user can set the predetermined value to an arbitrary value.

Once keywords have been assigned to images, it is possible to retrieve a desired image from a large number of images in terms of a particular keyword. It is also possible to produce an image album in terms of a particular theme.

For example, a keyword "people" is assigned to portraits, and a keyword "spring", "summer", "autumn", or "winter" is assigned to pictures characterized by such a season. If it is desired to retrieve a picture of children playing with a dog on a summer vacation, then the picture can be obtained by performing retrieval using keywords "people-child", "summer", and "animals-dog".

The retrieval result is displayed in such a manner that pictures obtained via the retrieval are displayed in an array fashion in a new window.

As described above, the technique of the present embodiment provides an easy and high-efficiency method of assigning a keyword to image data.

Furthermore, when reduced-size images are displayed in the form of a list of thumbnail images, labels representing the keywords assigned to the respective images are indicated in small limited areas in a clear and systematic fashion.

A series of stored images may be displayed along the time axis in the order of image taking date/time so that the places and situations in which the image were taken can be easily determined thus making it easy to classify the images and assign keywords to the respective images.

When images are displayed along the time axis in the order of image taking date/time, it is possible to group the images in such a manner that a plurality of images which are very near in terms of the image taking date/time are taken into the same group.

Furthermore, the objects of the present invention may also be achieved by supplying a storage medium, in which a software program implementing the functions of any of the embodiments described above is stored, to a system or an apparatus whereby a computer (CPU or MPU) in the system or apparatus reads and executes the program code stored in the storage medium.

In this case, it should be understood that the program code read from the storage medium implements the functions of invention and thus the storage medium storing the program code falls within the scope of present invention.

Storage media which can be preferably employed in the present invention to supply the program code include a floppy disk, hard disk, optical disk, magneto-optical disk, CD-ROM, CD-R, magnetic tape, non-volatile memory card, and ROM.

Furthermore, the scope of the present invention includes not only such a system in which the functions of any embodiment described above is implemented simply by reading and executing a program code on a computer, but also a system in which a part of or the whole of a process instructed by the program code is performed using an OS (operating system) on the computer.

Furthermore, the scope of the present invention also includes a system in which a program code is transferred once from a storage medium into a memory provided in a function extension board inserted in a computer or provided in a function extension unit connected to the computer, and then a part of or the whole of the process instructed by the program code is performed by a CPU or the like in the function extension board or the function extension unit thereby implementing the functions of any embodiment described above.

Furthermore, the scope of the present invention also includes a system in which in response to a request from a requester, a program implementing the functions of any embodiment is read from a storage medium and sent to the requester via a communication network such as a personal computer communication network.

As described above, the present invention provides a technique of easily and efficiently assigning a keyword to image data.

Reduced-size images can be displayed in the form of a list of thumbnail images so that the labels representing the keywords assigned to the respective images are indicated in limited small areas in a clear and systematic fashion.

Furthermore, a series of stored images can be displayed along the time axis in the order of image taking date/time so that the places and situations in which the image were taken can be easily determined thus making it easy to classify the images and assign keywords to the respective images.

Still furthermore, when images are displayed along the time axis in the order of image taking date/time, it is possible to group the images in such a manner that a plurality of images which are very near in terms of the image taking date/time are assigned to the same group.

What is claimed is:

1. An image processing apparatus comprising:
    storage means for storing a plurality of image data; and
    control means for controlling a process of displaying a plurality of image data stored in said storage means so that labels corresponding to keywords assigned to respective image data are displayed near the respective image data.

2. An image processing apparatus according to claim 1, further comprising decision means for determining display positions of the respective image data on the basis of date/time information of corresponding image data.

3. An image processing apparatus according to claim 1, wherein when a plurality of image data are displayed, the plurality of image data are displayed in a mode selected from a plurality of display modes.

4. An image processing apparatus according to claim 1, wherein the labels are displayed with particular colors so that the labels are identified by the colors.

5. An image processing apparatus according to claim 1, wherein the labels are displayed with particular symbols so that the labels are identified by the symbols.

6. An image processing apparatus according to claim 1, wherein the labels have a hierarchical structure.

7. An image processing apparatus according to claim 1, further comprising linking means for linking the labels to the image data.

8. An image processing apparatus according to claim 7, wherein said linking means establishes a link between a label and image data by dragging the label and dropping it onto the image data.

9. An image processing apparatus according to claim 1, wherein the image data is a reduced image of an original image.

10. An image processing apparatus according to claim 1, further comprising:
    pointing means for pointing to a label; and
    retrieval means for retrieving stored image data on a basis of information corresponding to the label pointed to by said pointing means.

11. An image processing apparatus according to claim 10, wherein said retrieval means retrieves image data in terms of a logical OR of a plurality of labels pointed to by said pointing means.

12. An image processing apparatus according to claim 10, wherein said retrieval means retrieves image data in terms of a logical AND of a plurality of labels pointed to by said pointing means.

13. An image processing apparatus according to claim 1, wherein said storage means includes control means for storing a plurality of image data together with image taking date/time information and grouping the plurality of image data on the basis of the image taking date/time information so that closely related image data belongs to the same group.

14. An image processing apparatus according to claim 13, further comprising keyword assignment means for assigning a keyword to grouped image data.

15. An image processing apparatus according to claim 1, further comprising input means for inputting image data.

16. An image processing method comprising the steps of:

storing a plurality of image data in a storage means; and controlling a process of displaying a plurality of image data stored in said storage means so that labels corresponding to keywords assigned to respective image data are displayed near the respective image data.

17. An image processing method according to claim 16, further comprising the step of determining the display positions of respective image data on the basis of date/time information of corresponding image data.

18. An image processing method according to claim 16, wherein when a plurality of image data are displayed, the plurality of image data are displayed in a mode selected from a plurality of display modes.

19. An image processing method according to claim 16, wherein the labels are displayed with particular colors so that the labels are identified by the colors.

20. An image processing method according to claim 16, wherein the labels are displayed with particular symbols so that the labels are identified by the symbols.

21. An image processing method according to claim 16, wherein the labels have a hierarchical structure.

22. An image processing method according to claim 16, further comprising the step of linking the labels to the image data.

23. An image processing method according to claim 22, wherein the linking step includes the step of dragging a label and dropping it onto image data thereby establishing a link between the label and the image data.

24. An image processing method according to claim 16, wherein said image data is a reduced image of an original image.

25. An image processing method according to claim 16, further comprising the steps of:

pointing to a label; and retrieving stored image data on a basis of information corresponding to the label pointed to by said pointing means.

26. An image processing method according to claim 25, wherein said retrieving step includes the step of retrieving image data in terms of a logical OR of a plurality of labels pointed to in said pointing step.

27. An image processing method according to claim 25, wherein said retrieving step includes the step of retrieving image data in terms of a logical AND of a plurality of labels pointed to in said pointing step.

28. An image processing method according to claim 16, wherein said storing step includes the step of controlling an operation of storing a plurality of image data together with image taking date/time information and grouping the plurality of image data on the basis of the image taking date/time information so that closely related image data belongs to the same group.

29. An image processing method according to claim 28, further comprising the step of assigning a keyword to grouped image data.

30. An image processing method according to claim 16, further comprising the step of inputting image data.

31. A storage medium storing a program for performing a process comprising the steps of:

storing a plurality of image data in a storage means; and controlling a process of displaying a plurality of image data stored in said storage means so that labels corresponding to keywords assigned to respective image data are displayed near the respective image data.

32. A storage medium according to claim 31, wherein said program further comprises the step of determining the display positions of respective image data on the basis of date/time information of corresponding image data.

33. A storage medium according to claim 31, wherein when a plurality of image data are displayed, the plurality of image data are displayed in a mode selected from a plurality of display modes.

34. A storage medium according to claim 31, wherein the labels are displayed with particular colors so that the labels are identified by the colors.

35. A storage medium according to claim 31, wherein the labels are displayed with particular symbols so that the labels are identified by the symbols.

36. A storage medium according to claim 31, wherein the labels have a hierarchical structure.

37. A storage medium according to claim 31, wherein said program further comprises the step of linking the labels to the image data.

38. A storage medium according to claim 37, wherein said linking step includes the step of dragging a label and dropping it onto image data thereby establishing a link between the label and the image data.

39. A storage medium according to claim 31, wherein the image data is a reduced image of an original image.

40. A storage medium according to claim 31, wherein said program further comprises the steps of:

pointing to a label; and retrieving stored image data on a basis of information corresponding to the label pointed to by said pointing means.

41. A storage medium according to claim 40, wherein said retrieving step includes the step of retrieving image data in terms of a logical OR of a plurality of labels pointed to in said pointing step.

42. A storage medium according to claim 40, wherein said retrieving step includes the step of retrieving image data in terms of a logical AND of a plurality of labels pointed to in said pointing step.

43. A storage medium according to claim 31, wherein said storing step includes the step of controlling an operation of storing a plurality of image data together with image taking date/time information and grouping the plurality of image data on the basis of the image taking date/time information so that closely related image data belongs to the same group.

44. A storage medium according to claim 43, wherein said program further comprises the step of assigning a keyword to grouped image data.

45. A storage medium according to claim 31, wherein said program further comprises the step of inputting image data.

* * * * *

UNITED STATES PATENT AND TRADEMARK OFFICE
CERTIFICATE OF CORRECTION

PATENT NO.    : 6,795,094 B1
DATED         : September 21, 2004
INVENTOR(S)   : Kazuhiro Watanabe et al.

It is certified that error appears in the above-identified patent and that said Letters Patent is hereby corrected as shown below:

Title page,
Item [54], Title, reads "METHOD AND APPARATUS FOR PROCESSING AN IMAGE, AND STORAGE" should read -- METHOD AND APPARATUS FOR PROCESSING AN IMAGE, AND STORAGE MEDIUM --.

Column 1,
Line 2, "STORAGE" should read -- STORAGE MEDIUM --; and
Line 58, "calender" should read -- calendar --.

Column 5,
Lines 38, 39 and 49, "calender" should read -- calendar --; and
Line 64, "on-the" should read -- on the --.

Column 6,
Lines 3 and 5, "calender" should read -- calendar --; and
Line 32, "date," should read -- data, --.

Column 7,
Line 10, "image" should read -- images --;
Line 28, "invention" should read -- the invention --;
Line 29, "present" should read -- the present --; and
Line 37, "is" should read -- are --.

Column 8,
Line 1, "image" should read -- images --.

Signed and Sealed this

Fifth Day of July, 2005

JON W. DUDAS
*Director of the United States Patent and Trademark Office*